United States Patent
Nishida et al.

(10) Patent No.: US 8,587,752 B2
(45) Date of Patent: Nov. 19, 2013

(54) LIQUID CRYSTAL DISPLAY DEVICE WITH LIGHT SHIELDING COVERING TWO-LAYERED COMMON ELECTRODE

(75) Inventors: Shinichi Nishida, Kanagawa (JP); Sounosuke Takahashi, Kanagawa (JP); Takahiko Watanabe, Kanagawa (JP); Yoshikazu Sakaguchi, Kanagawa (JP); Taku Kawasaki, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 609 days.

(21) Appl. No.: 12/638,117

(22) Filed: Dec. 15, 2009

(65) Prior Publication Data

US 2010/0149467 A1 Jun. 17, 2010

(30) Foreign Application Priority Data

Dec. 15, 2008 (JP) ................. 2008-318630

(51) Int. Cl.
 *G02F 1/1333* (2006.01)
 *G02F 1/1335* (2006.01)
 *G09G 3/36* (2006.01)

(52) U.S. Cl.
 USPC ........... 349/110; 349/111; 349/113; 349/106; 345/88

(58) Field of Classification Search
 USPC .................... 349/106, 110, 111, 113
 See application file for complete search history.

(56) References Cited

U.S. PATENT DOCUMENTS

| | | | |
|---|---|---|---|
| 5,926,236 A | | 7/1999 | den Boer et al. |
| 7,310,124 B2 * | | 12/2007 | Tsubata et al. ............ 349/110 |
| 7,405,792 B2 * | | 7/2008 | Lee ............ 349/139 |
| 2002/0018149 A1 * | | 2/2002 | Kanayama ............ 349/1 |
| 2002/0075429 A1 * | | 6/2002 | Fujioka et al. ............ 349/106 |
| 2005/0078252 A1 * | | 4/2005 | Lin ............ 349/139 |
| 2005/0147899 A1 * | | 7/2005 | Sun et al. ............ 430/7 |
| 2006/0108587 A1 * | | 5/2006 | Lee et al. ............ 257/72 |
| 2008/0225212 A1 * | | 9/2008 | Ong ............ 349/106 |

FOREIGN PATENT DOCUMENTS

| | | |
|---|---|---|
| CN | 1305120 | 7/2001 |
| JP | 2000-029014 | 1/2000 |
| JP | 2003-014917 | 1/2003 |

OTHER PUBLICATIONS

Chinese Official Action dated Dec. 5, 2012 issued by the Chinese Patent Office in Chinese Patent Application No. 200910260466.4, 6 pages.

* cited by examiner

*Primary Examiner* — Hoan C Nguyen

(74) *Attorney, Agent, or Firm* — Young & Thompson

(57) ABSTRACT

A normally-black active-matrix-type liquid crystal display device comprises a first substrate having color layers of three or more colors and a second substrate on which an active-matrix array is formed. The first substrate has a structure, which is devoid of a black matrix, in which the color layers are stacked in a frame portion surrounding the display area. A first light-shielding layer in which color layers of three of more colors are stacked is formed on the frame portion on a side of the display area from which scanning lines are led out and on a side of the display area from which data lines are led out, from among four sides of the display area. A second light-shielding layer in which color layers of two colors are built up is formed on the frame portion on at least one side of the other remaining sides of the display area.

20 Claims, 5 Drawing Sheets

A-A'

B-B' AND C-C'

A-A'

B-B'

C-C'

LIQUID CRYSTAL DISPLAY DEVICE WITH LIGHT SHIELDING COVERING TWO-LAYERED COMMON ELECTRODE

TECHNICAL FIELD

Reference to Related Application

This application is based upon and claims the benefit of the priority of Japanese patent application No. 2008-318630, filed on Dec. 15, 2008, the disclosure of which is incorporated herein in its entirety by reference thereto.

This invention relates to an active-matrix-type liquid crystal display device and, more particularly, to an active-matrix-type liquid crystal display device having a light-shielding structure in which color layers are stacked and replace a black matrix.

BACKGROUND

There has been strong demand in recent years for a device structure and manufacturing process that can enable the manufacture, at lower cost, of an active-matrix-type liquid crystal display device exhibiting excellent display quality.

For example, in order to block light impinging from the frame surrounding a display area in a liquid crystal display device, a light-shielding layer referred to as a "black matrix" is formed on the side of a substrate having a color filter (a color-filter substrate) using a metal such as chrome (chrome oxide) or a resin. For the purpose of lowering cost, however, a technique for eliminating the black matrix has been proposed.

For example, Patent Documents 1 and 2, cited below, disclose techniques for forming a light-shielding layer on the frame portion surrounding the liquid crystal area by stacking colored layers of at least two colors selected from a plurality thereof.

[Patent Document 1]
Japanese Patent Kokai Publication No. JP2000-290014A
[Patent Document 2]
Japanese Patent Kokai Publication No. JP2003-14917A

SUMMARY

As disclosed in Patent Documents 1 and 2, a technique for forming a light-shielding structure by stacking a plurality of layers, which constitute a color filter, without using a black-matrix layer is an effective method in terms of lowering cost.

With the conventional techniques, however, the frame portion surrounding the display area of the liquid crystal display device is formed on all four sides by superimposing three or more colors or two or more colors. As a result of detailed studies, these techniques have been found to have the problems set forth below.

First, in a case where two colors are superimposed to form the frame on all four sides of the display area, the following problem arises:

If a normally-black liquid crystal is used, a portion inside the liquid crystal display device where an alignment-treated alignment film and polarizers external to the film are present is shielded from light by these elements, a frame having an attractive appearance is obtained even with the low OD (Optical Density) value of two superimposed colors. Normally, however, in order to prevent a seal and the alignment film from interfering with each other, the area where the alignment film is formed can only extend a fixed distance into the interior from the seal formed in order to seal the liquid crystal inside the cell. As a consequence, the light-shielding performance on the outer side of the alignment film is inferior to that on the inner side of the alignment film. With the low OD value of two superimposed colors, therefore, one can see through the superimposed colors when the device is viewed in a darkened environment and hence the quality of the display declines. In order to compensate for this, placing a metal layer on the side of the active-matrix substrate has been proposed. However, blocking the light between wiring traces is extremely difficult and is essentially impossible on the side where scanning lines are led out and on the side where the data lines are led out.

On the other hand, in a case where three or more colors are superimposed to form the frame on all four sides of the display area, the following problem arises:

In the case of a transverse-field liquid crystal display device, it is required that the display area be supplied from the periphery with a common potential using a fairly low resistance value. In order to thus supply the display area with a common potential using a low resistance, often two or more metal layers necessary when an active matrix is formed, namely a metal layer for forming scanning lines and a metal layer for forming data lines, are stacked and placed at the frame portion as common electrode wiring. Since the metal wiring traces of the two layers thus formed each have a thickness of about 2500 A, the total film thickness on the active-matrix substrate is 5000 A greater in comparison with the portion devoid of the metal wiring layers. Similarly, with regard to the color-filter substrate, the film thickness of each color layer is on the order of 1.5 µm. The film thickness of the frame portion composed of the three stacked color layers, therefore, is 3 µm greater in comparison with the display area having only a single color layer. When these two substrates are bonded together, an attempt is made to obtain a value of e.g., 3.5 µm for the cell gap, namely the distance between the active-matrix substrate and the color-filter substrate in the display area. At the portion where the two-layer common electrode wiring and three-superimposed-color portion are superimposed in such case, the fact that these have the above-mentioned thicknesses of 5000 A and 3.0 µm, respectively, means that the clearance between the two members becomes almost zero. As a consequence, the problem which arises is that the two substrates come into contact, gap uniformity and liquid crystal encirclement at this portion become unsatisfactory and an air bubble is formed. Thus there is much to be desired in the art.

Accordingly, it is a the main object thereof to provide an active-matrix-type liquid crystal display device having a structure in which color layers are stacked and substituted for a black matrix, wherein the frame portion can be positively shielded from light while supply of a common electrode potential in the active-matrix substrate by a low resistance is facilitated.

According to the present invention, there is provided an active-matrix liquid crystal display device, the liquid crystal of which is normally black, comprising: a first substrate having color layers of three or more colors; and a second substrate on which an active-matrix array is formed. The first substrate has a structure, which is devoid of a black matrix, in which the color layers are stacked in a frame portion surrounding a display area. A first light-shielding layer in which color layers of three or more colors are stacked is formed on the frame portion on a side of the display area from which scanning lines are led out and on a side of the display area from which data lines are led out, from among four sides of the display area. A second light-shielding layer in which color layers of two colors are stacked is formed on the frame portion on at least one side of the other remaining sides of the display area.

Further, the active-matrix liquid crystal display device of the present invention may be such that two or more metal layers to which a common electrode potential is applied are placed in an area of the second substrate opposing the second light-shielding layer.

Further, the active-matrix liquid crystal display device of the present invention may be such that the two colors of the second light-shielding layer are red and blue.

Further, the active-matrix liquid crystal display device of the present invention may be such that the side of the display area on which the second light-shielding layer is formed is provided with an injection hole for injecting liquid crystal.

The meritorious effects of the present invention are summarized as follows.

In accordance with the present invention, a normally-black active-matrix-type liquid crystal display device having a structure devoid of a black-matrix layer is so adapted that the frame portion thereof can be positively shielded from light while supply of a common electrode potential in the active-matrix substrate by a low resistance is facilitated.

Other features and advantages of the present invention will be apparent from the following description taken in conjunction with the accompanying drawings, in which like reference characters designate the same or similar parts throughout the figures thereof.

BRIEF DESCRIPTIONS OF THE DRAWINGS

PREFERRED MODE

Figure 1:
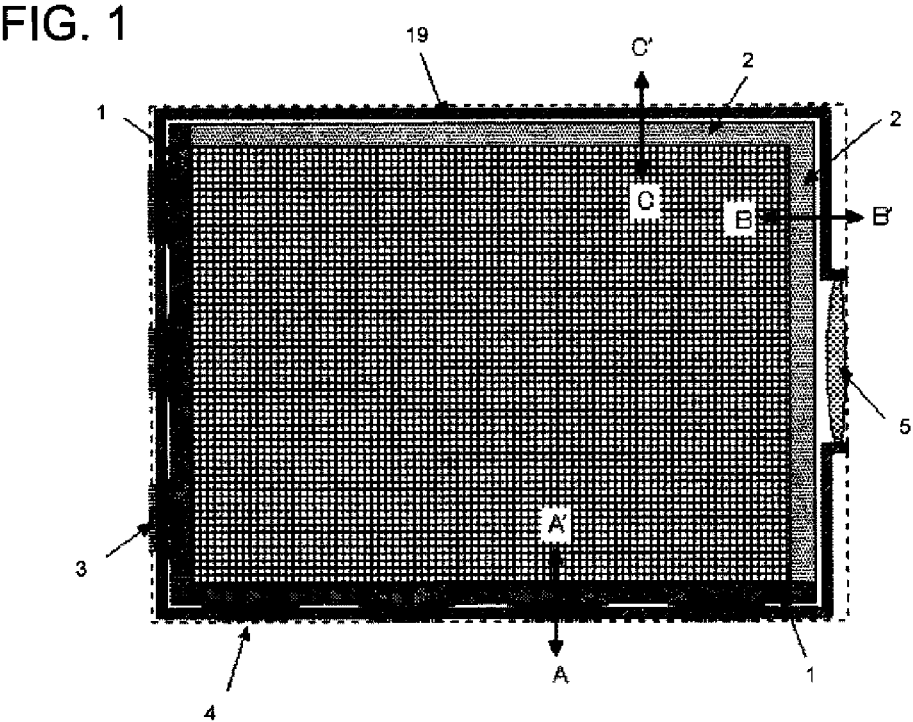
FIG. 1 is a plan view illustrating a liquid crystal display device according to a first exemplary embodiment of the present invention.

An active-matrix liquid crystal display device according to the present invention includes a normally-black liquid crystal and has a first substrate (a color-filter substrate 10) on which a color filter has been formed and a second substrate (an array substrate 20) on which an active-matrix array has been formed. Among the four sides of the display area of the liquid crystal display device, there is a side having scanning-line lead-out wiring 3 and a side having data-line lead-out wiring 4. The color-filter substrate 10 is devoid of a black matrix. A light-shielding layer 1, which includes three or more superimposed colors (layers), is disposed on the color-filter substrate 10 on a frame portion thereof at the periphery of the display area, the light-shielding layer 1 being placed on the side of the device having the scanning-line lead-out wiring 3 and on the side of the device having the data-line lead-out wiring 4. A light-shielding layer 2 formed of two superimposed colors (layers) is disposed on the color-filter substrate 10 on the frame portion thereof on at least one side of the other remaining sides of the device.

As a result, on the sides where the scanning-line and data-line leads are present, the frame portion at the periphery of the display area has stacked layers of three or more colors so that the light-shielding performance is excellent even in areas in which light cannot be blocked by the metal electrodes of the active-matrix substrate. This means that an excellent frame is obtained with almost no leakage of light external to an area in which an alignment film is printed.

Further, the frame portion on at least one side of the two sides where the scanning-line and data-line lead-out wiring 3, 4, respectively, do not exist is formed to have the light-shielding layer 2 consisting of two superimposed colors. As a result, a satisfactory clearance is obtained between the array substrate 20 and the color-filter substrate 10, and common electrode wiring 21, 22 consisting of two stacked layers, namely a metal layer forming scanning lines and a metal layer forming data lines, can be placed in this clearance. By supplying the display area with a common electrode potential via the common electrode wiring, the common electrode potential at the display area is stabilized and a problem such as transverse crosstalk caused by a fluctuation in this potential can be suppressed. The result is that an excellent display quality is obtained. Furthermore, the common electrode wiring 21, 22 placed in the frame portion is made sufficiently broad so that light which has entered from a backlight will not pass through the frame portion and be visible to a person looking at the liquid crystal display device. As a result, inadequate light-shielding performance of the light-shielding layer 2 composed of two superimposed colors is compensated for by the light-shielding effect of the common electrode wiring 21, 22.

Usually, color layers of the three primary colors red (R) 7, green (G) 6 and blue (B) 8 are used in a color filter. In the case of a color filter composed of these layers of three colors, three superimposed colors R, G, B are used at a frame portion where the scanning-line or data-line lead-out wiring is disposed, and two superimposed colors R and B are used in the light-shielding layer, which is composed of two superimposed colors, on at least one side of the remaining sides. The light-shielding performance of two superimposed colors among the three colors R, G, B is best when the two superimposed colors used are R and B. As a result, it is possible to suppress a decline in display quality caused by light, which impinges upon the frame portion of two superimposed colors from the top side (from the direction in which the display is viewed), passing through the light-shielding layer of two superimposed colors and re-emerging from the top side upon being reflected by the metal wiring on the side of the active matrix.

[First Exemplary Embodiment]

Figure 2:
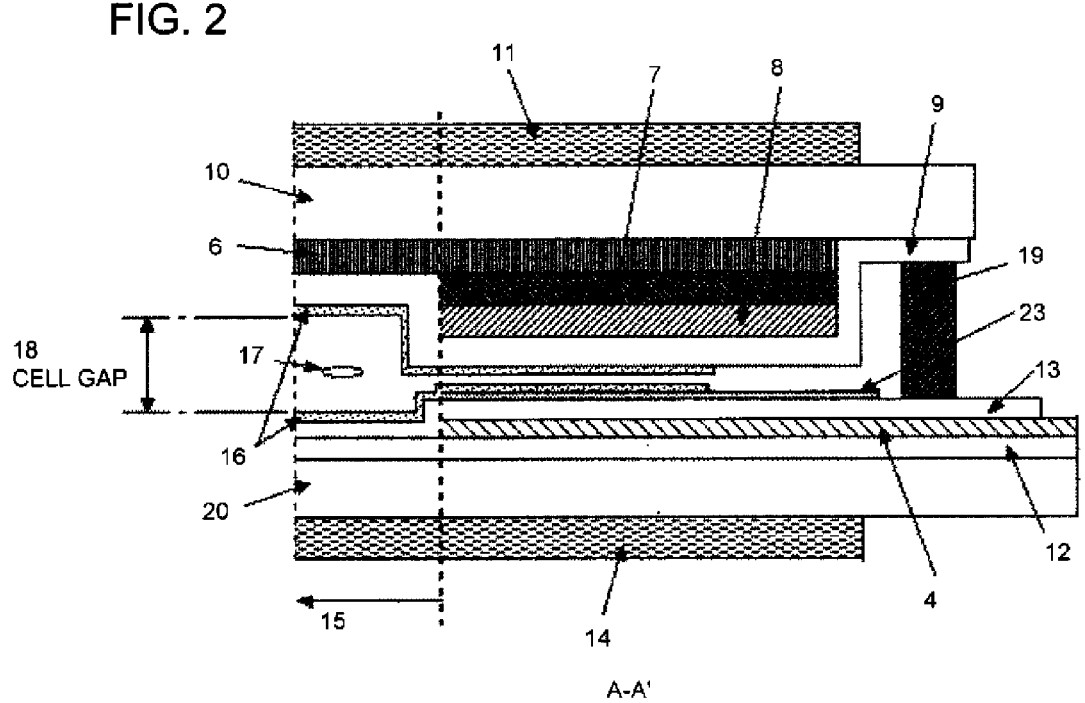
FIG. 2 is a sectional view illustrating the structure of the liquid crystal display device according to the first exemplary embodiment taken along line A-A' of FIG. 1, wherein the section is taken along data-line lead-out wiring at the frame portion.
Figure 3:
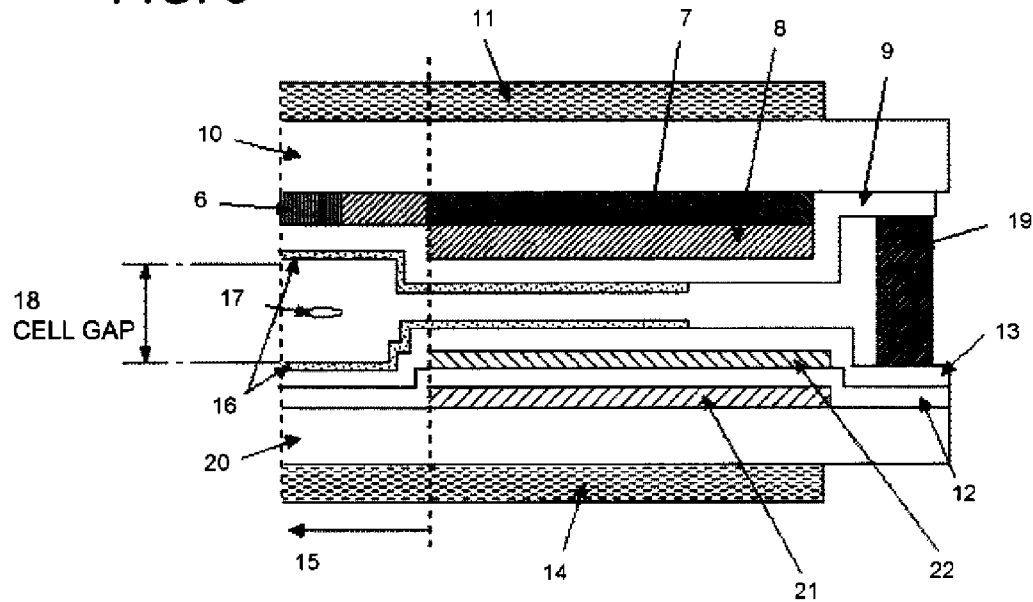
FIG. 3 is a sectional view illustrating the structure of the liquid crystal display device according to the first exemplary embodiment taken along line B-B' and C-C' of FIG. 1.
Figure 8A:
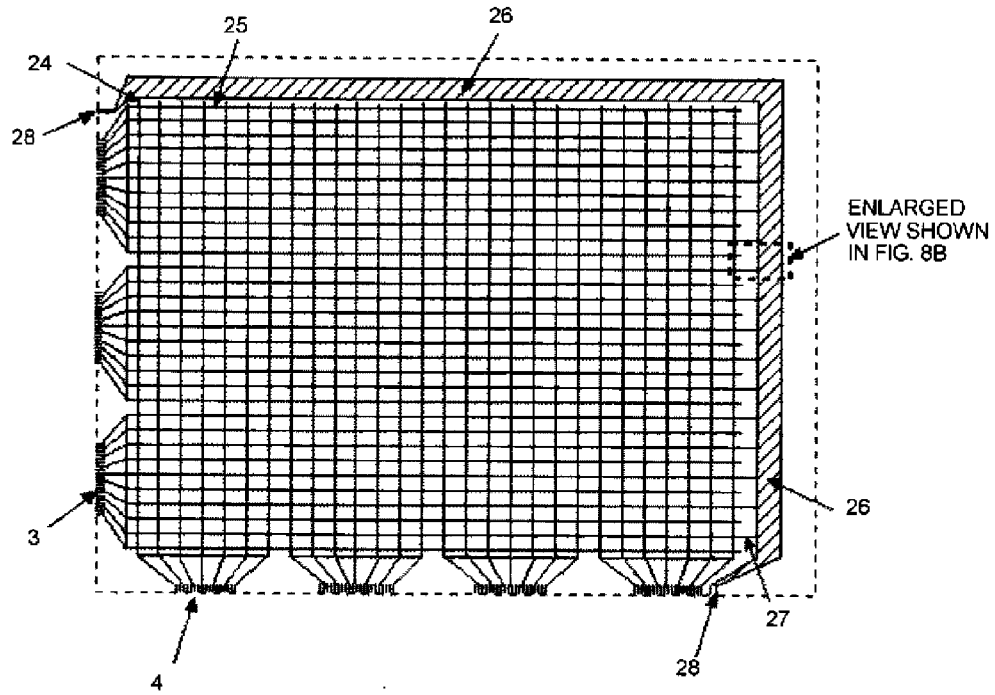
FIG. 8A is a plan view illustrating the arrangement of electrodes on an array substrate of the liquid crystal display device according to the first exemplary embodiment.
Figure 8B:
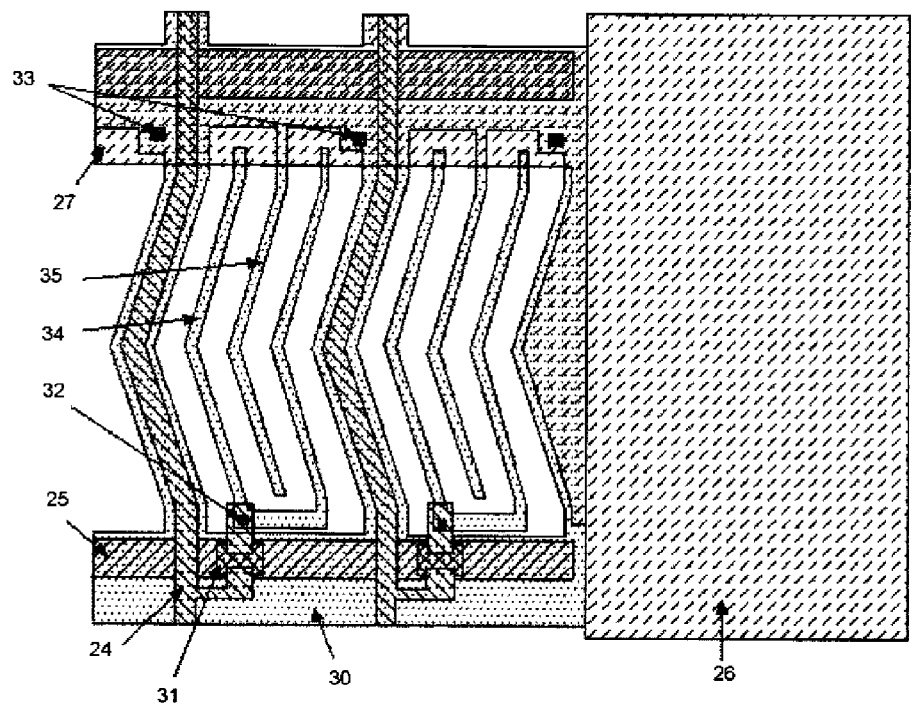
FIG. 8B is an enlarged view of an area designated in FIG. 8A in the plan view illustrating the arrangement of electrodes on the array substrate of the liquid crystal display device according to the first exemplary embodiment.

Reference will now be had to FIGS. 1 to 3 and to FIGS. 8A and 8B to describe in detail an active-matrix liquid crystal display device according to a first exemplary embodiment of the present invention. FIG. 1 is a plan view illustrating an active-matrix liquid crystal display device according to this exemplary embodiment, FIG. 2 is a sectional view taken along line A-A' of FIG. 1, FIG. 3 is a sectional view taken along line B-B' of FIG. 1, FIG. 8A is a plan view illustrating the arrangement of electrodes on an array substrate, and FIG. 8B is an enlarged plan view of an area shown in FIG. 8A.

As illustrated in FIG. 2, the liquid crystal display device of this exemplary embodiment includes the array substrate 20 having an array pattern in which pixels having switching elements such as TFTs (Thin-Film Transistors) are arranged in the form of a matrix; the color-filter substrate 10 opposing the array substrate 20; liquid crystal 17 sandwiched between the substrates 10 and 20; and a seal 19 joining these two substrates and sealing in the liquid crystal 17. In a display area of the color-filter substrate 10, color layers of each of the colors are disposed in opposition to the pixels of the array substrate 20, one or a plurality of color layers are stacked on the frame portion at the periphery of the display area 15, and an overcoat 9 is formed so as to cover these color layers.

On the side having the scanning-line lead-out wiring 3 and on the side having the data-line lead-out wiring 4, the frame portion at the periphery of the display area 15 forms the light-shielding layer 1 composed of the three superimposed colors R, G, B, and the frame portion on the other two sides forms the light-shielding layer 2 composed of the two superimposed colors R and B, as illustrated in FIG. 1.

At the frame portions formed by the two colors, the common electrode wiring 21, 22, which is supplied with a common potential, is formed on the side of the array substrate 20 and comprises stacked metal layers, namely a first metal layer forming the scanning lines and a second metal layer forming the data lines, respectively. Since the common electrode wiring formed by two layers has a low resistance (also with sufficient width) the interior of the display can be supplied with a stable common potential. As a result, a problem such as transverse crosstalk that accompanies a fluctuation in common potential can be suppressed.

As illustrated in FIG. 8A, a common potential is input to common electrode wiring 26 from a common-potential input terminal 28 provided at the corner of the side having the data-line lead-out wiring 4 and the side having the scanning-line lead-out wiring 3. Since the common electrode wiring 26 is formed by two layers of metal, a common potential can be transmitted at low resistance. Common signal line 27 is led out from the common electrode wiring 26 and the common potential is supplied up to the display area. As illustrated in FIG. 8B, the common potential is connected to a common electrode 35 of each pixel via a through-hole 33 for making contact with the common electrode with which each pixel is provided.

In this exemplary embodiment, switching of the liquid crystal is carried out by IPS (In-Plane Switching) whereby transmitted light is controlled by applying a transverse electric field between the potential of a pixel electrode 34, which is supplied via a thin-film transistor and a through-hole 32 for the pixel electrode, and the potential of the common electrode 35.

With IPS, a high-aperture-ratio display can be obtained by shielding scanning lines 25 and data lines 24 using an ITO (Indium Tin Oxide) common electrode 30 in the display area, as illustrated in FIG. 8B. In such case it is especially required that the common potential be supplied from the periphery at a low resistance owing to a capacitive load ascribable to capacitive coupling between the common electrode 30 and the scanning lines 25 and data lines 24. Since the two layers of metal wiring provided in the frame portion have a low resistance under these circumstances, this arrangement is very effective and is accompanied by the fact that the problem of transverse crosstalk can be markedly suppressed.

Further, the common electrode wiring 26 is placed in substantially the entire area, outside the display area, through which is transmitted the backlight that passes through in the direction from which the display is viewed. As a result, the low OD ascribable to the light-shielding layer composed of the two superimposed color layers can be compensated for by the common electrode wiring 21, 22.

On the other hand, since the light-shielding layer of the frame on the sides where the scanning-line lead-out wiring 3 and data-line lead-out wiring 4 reside is formed by three superimposed colors, the light-shielding performance is sufficiently high and even light that passes through the incomplete alignment area where the alignment film has not been formed is blocked sufficiently by the light-shielding layer of three superimposed colors.

In this exemplary embodiment, for instance, the thickness of each layer of the R, G, B layers was made 1.5 µm and the thickness of each metal layer of the metal layers of the scanning lines and data lines was made 0.25 µm. The cell gap of the display area was made 3.5 µm, and the film thickness of the ITO comprising the uppermost layer was made 0.04 µm, by way of example.

As a result, at the frame portion on the sides having the scanning-line lead-out wiring 3 and data-line lead-out wiring 4, the array side of the area in which each of the lead-out wiring traces resides was 0.29 µm thicker than the display area and the color-filter side was 3.0 µm thicker. At the frame portion, therefore, the cell gap was narrowed by 3.29 µm so that the clearance obtained between the array substrate and the color-filter substrate was 2.1 µm. This clearance was satisfactory and afforded an excellent display.

Further, on the two sides devoid of the scanning-line lead-out wiring 3 and data-line lead-out wiring 4, the array side was 0.5 µm thicker than the display area and the side of the color-filter substrate was 1.5 µm thicker. At the frame portion, therefore, the cell gap was narrowed by 2.0 µm so that the clearance obtained between the array substrate and the color-filter substrate was 1.5 µm. This clearance was satisfactory and afforded an excellent display without interference arising when the gap was formed.

A method of manufacturing the liquid crystal display device having the structure set forth above will now be described.

The method of manufacturing the color-filter substrate 10 will be described first.

First, after a coating of a resist which will be the G-color layer 6 is applied, exposure to light is performed using an exposure mask that includes a pattern comprising the G-color layer pattern of the display area 15 and the frame portion that includes the scanning-line and data-line lead-out wiring 3, 4. This is followed by development and firing, thereby forming the G-color layer 6 to a thickness of 1.5 µm.

Next, after a coating of a resist which will be the R-color layer 7 is applied, exposure to light is performed using an exposure mask that includes a pattern comprising the R-color layer pattern of the display area 15 and the frame portion of the four sides. This is followed by development and firing, thereby forming the R-color layer 7 to a thickness of 1.5 µm.

Furthermore, after a coating of a resist which will be the B-color layer 8 is applied, exposure to light is performed using an exposure mask that includes a pattern comprising the B-color layer pattern of the display area 15 and the frame portion of the four sides. This is followed by development and firing, thereby forming the B-color layer 8 to a thickness of 1.5 μm.

Next, these color layers are coated to a thickness of 1.0 μm with a transparent acrylic resin which will be the overcoat 9. This is following by firing. Next, columnar spacers are formed thereon using an acrylic resin. The color-filter substrate 10 is obtained as a result.

In the description rendered above, a case where the color layers of the three colors are stacked in the order G, R, B. However, the stacking order can be changed. Further, the columnar spacers may be formed on the side of the array substrate 20, or spherical spacers may be used rather than forming columnar spacers. Further, the film thickness of the color layers can be adjusted in conformity with the chromaticity sought.

A method of manufacturing the array substrate 20 will be described next.

This method is a method of manufacture that is entirely the same as that of an active-matrix array substrate in which the switching elements are TFTs using the usual a-Si. For example, the array substrate 20 can be manufactured through the procedure set forth below.

First, a 2500-A first metal layer (an opaque metal) which will be the scanning lines 25 and common-signal line 27 is worked into a prescribed pattern. At this time the shape of the common electrode wiring 26 of the frame portion on the side opposing the side of the scanning-line leads and on the side opposing the side of the data-line leads.

After a gate insulating film 12 and a thin-film semiconductor layer 31 are formed, the thin-film semiconductor layer 31 is formed into island shapes only in a portion which will be the switching elements.

Next, a 2500-A second metal layer which will be the data lines 24 is worked into a prescribed pattern and an island-shaped contact layer of the thin-film semiconductor layer 31 is etched using this pattern.

Furthermore, after an insulating film which will be a passivation film 13 is formed, a though-hole for contact is formed and interdigitated electrodes comprising the pixel electrode 34 and common electrode 35 consisting of 400-A ITO (Indium Tin Oxide) are formed thereon. The pixel electrode 34 is connected via a though-hole 32 to the drain electrode of the thin-film transistor formed by the second metal layer, and the common electrode 35 is connected to the common-signal line 27 formed by the first metal layer.

In the frame portion where the scanning-line lead-out wiring 3 and data-line lead-out wiring 4 resides, the scanning-line lead-out wiring 3 and data-line lead-out wiring 4 is suitably shielded by an ITO transparent electrode 23 of the uppermost layer, to which the common potential is applied, in order to prevent the director of the liquid crystal from rotating owing to the influence of a potential difference between these wiring traces, as a result of which the light-shielding ability would no longer be maintained when the device is in the non-operating state. The ITO transparent electrode 23 is connected to the common potential.

After an alignment film 16 is formed between the color-filter substrate 10 and array substrate 20 formed in the manner described above, these are bonded together and the liquid crystal 17 is injected between them and sealed in. The liquid crystal 17 is homogeneously oriented and the polarizer is formed by crossed Nicols so as to be normally black. The liquid crystal is in the so-called IPS mode in which it is driven by an electric field, which is parallel to the substrates, produced across the pixel electrode 34 and common electrode 35.

In this exemplary embodiment, an injection hole 5 used when the liquid crystal is injected is provided in the two-superimposed-color side of the frame opposite the side on which the scanning-line lead-out wiring 3 exists. The liquid crystal is injected from the hole 5 by the vacuum injection method. When the liquid crystal 17 enters the interior of the cell, the fact that the clearance between the array substrate 20 and color-filter substrate 10 is sufficient means that injection time is short, problems such as injection failure do not occur and panel formation is facilitated.

The alignment film 16 is formed, for instance, approximately 0.7 mm distant from the seal printing area in order to avoid interference with the seal 19. As a result, although entrant light from the backlight also passes through the region of incomplete alignment outside the alignment-film printing area, the light-shielding layer 1 of three superimposed colors presents an adequate light-shielding ability and, hence, the excellent quality of the frame portion is maintained.

Finally, polarizers 11, 14 are bonded to both sides and the prescribed circuitry is connected to the liquid crystal panel, whereby the liquid crystal display device of this exemplary embodiment is obtained.

Thus, a satisfactory light-shielding performance is provided with the frame on the display-area sides having the scanning-line lead-out wiring 3 and data-line lead-out wiring 4 being made the light-shielding layer 1 of three superimposed colors. On the side of the array substrate 20, the common electrode wiring 21, 22 comprising the stacked metal layers of the first and second metal layers are disposed with the other sides of the display area being made the light-shielding layer 2 of two superimposed colors. A common potential is supplied to the display area stably and, at the same time, the inadequate light-shielding performance of the light-shielding layer 2 of two superimposed colors on the color-filter side is compensated for by the light-shielding performance of the common electrode wiring 21, 22.

By virtue of the foregoing arrangement, the frame on all four sides of the display area can be provided with a satisfactory light-shielding performance and an excellent display quality can be obtained.

[Second Exemplary Embodiment]

Figure 4:
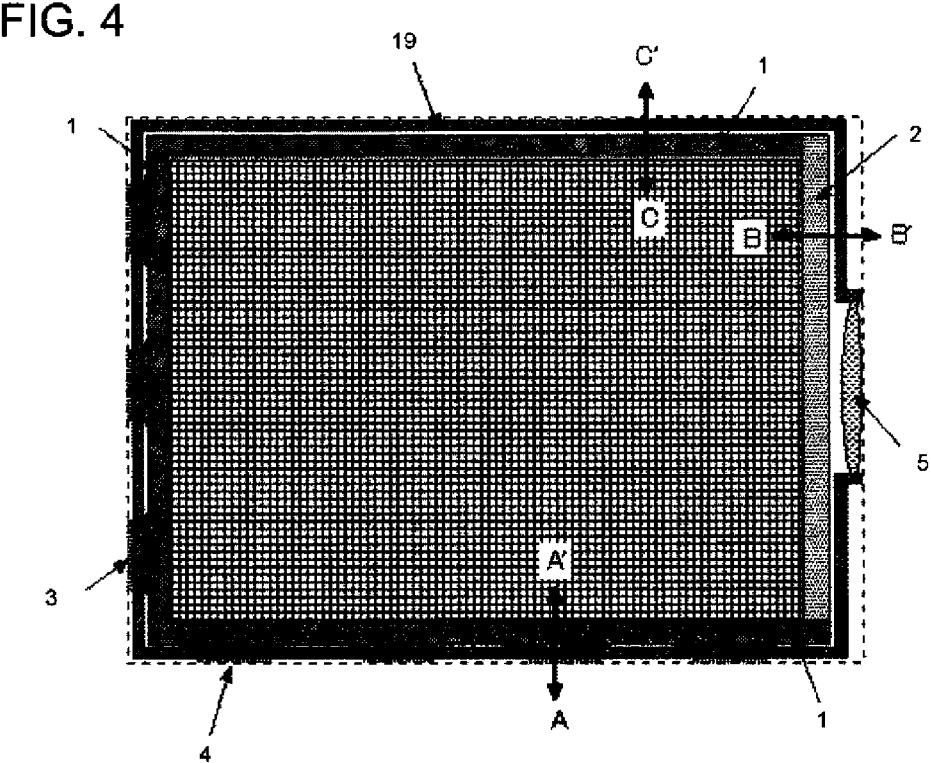
FIG. 4 is a plan view illustrating a liquid crystal display device according to a second exemplary embodiment of the present invention.
Figure 5:
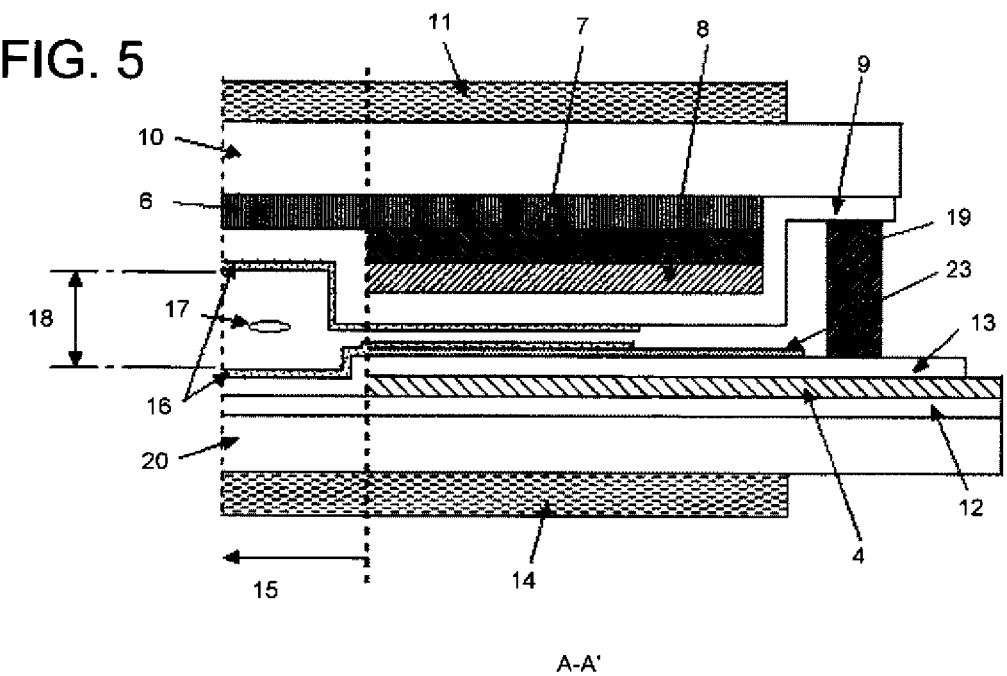
FIG. 5 is a sectional view illustrating the structure of the liquid crystal display device according to the second exemplary embodiment taken along line A-A' of FIG. 4, wherein the section is taken along data-line lead-out wiring at the frame portion.
Figure 6:
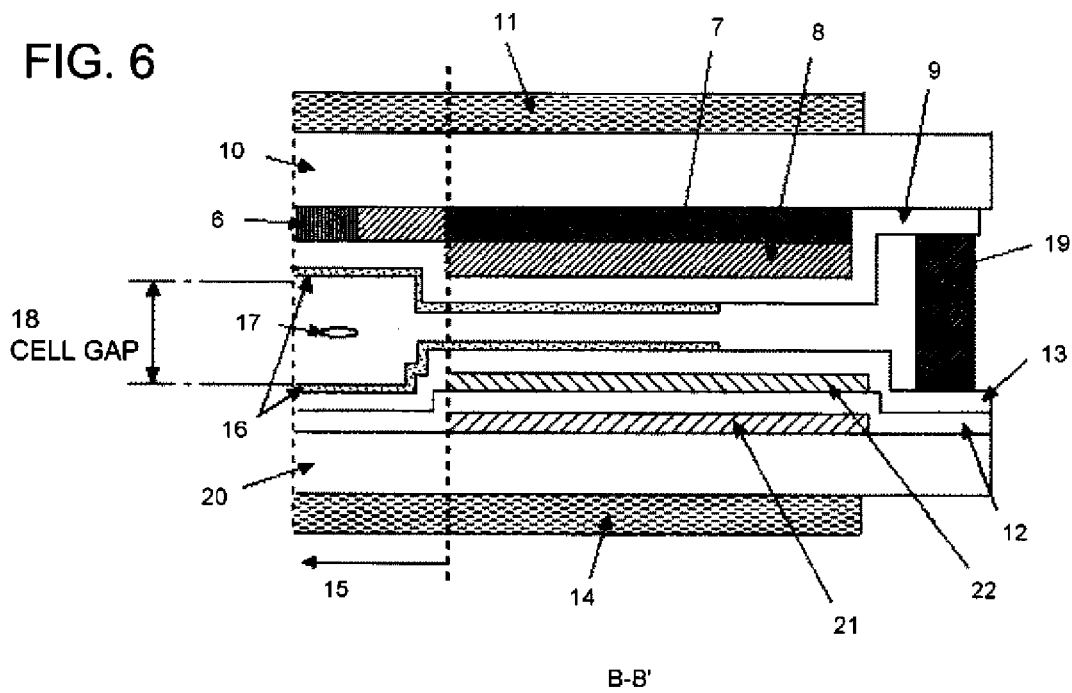
FIG. 6 is a sectional view illustrating the structure of the liquid crystal display device according to the second exemplary embodiment taken along line B-B' of FIG. 4.
Figure 7:
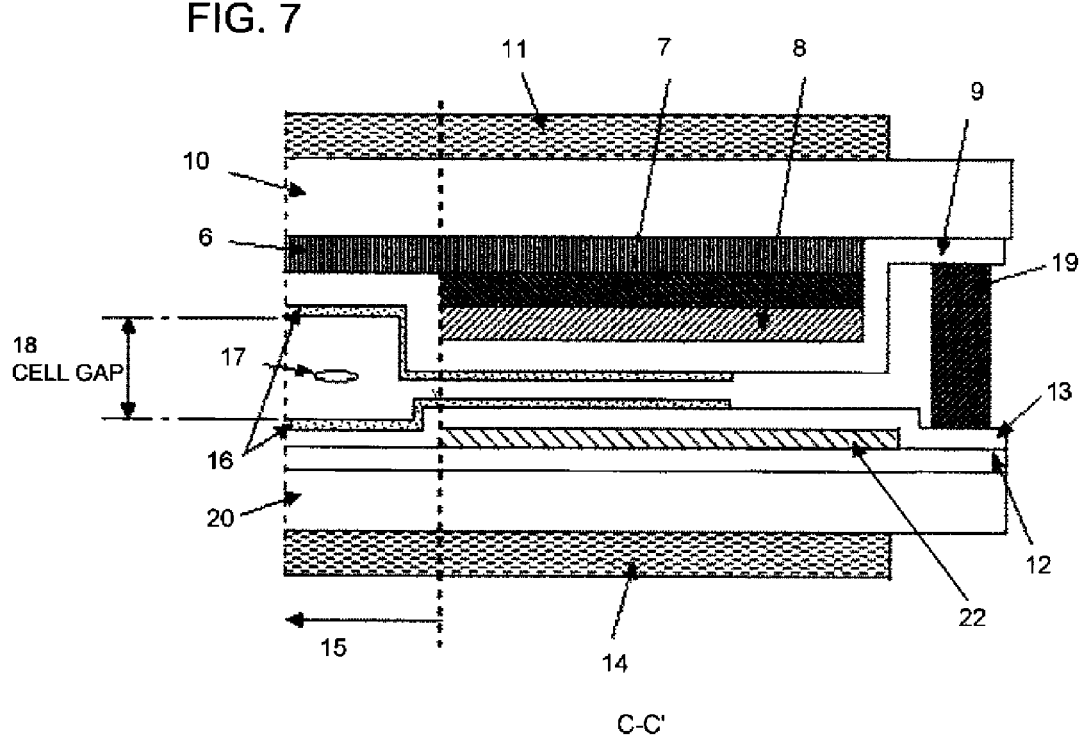
FIG. 7 is a sectional view illustrating the structure of the liquid crystal display device according to the second exemplary embodiment taken along line C-C' of FIG. 4.

Next, an active-matrix liquid crystal display device according to a second exemplary embodiment of the present invention will be described with reference to FIGS. 4 to 6. FIG. 4 is a plan view illustrating the arrangement of a frame of an active-matrix liquid crystal display device according to this exemplary embodiment, FIG. 5 is a sectional view taken along line A-A' of FIG. 4, FIG. 6 is a sectional view taken along line B-B' of FIG. 4, and FIG. 7 is a sectional view taken along line C-C' of FIG. 4.

In the first exemplary embodiment, only the frame portion on the side having the scanning-line lead-out wiring 3 and on the side having the data-line lead-out wiring 4 are formed to have the light-shielding layer 1 composed of the three superimposed colors R, G, B. By contrast, in this exemplary embodiment, as shown in FIG. 4, the frame portion on the side opposite the side having the data-line lead-out wiring 4 is also formed to have the light-shielding layer 1 composed of the three superimposed colors R, G, B. Only the frame portion on the single remaining side is formed to have the light-shielding layer 2 composed of the two superimposed colors R and B.

In conformity with this arrangement, the common electrode wiring 21, 22 comprising the stacked layers of the first metal layer and second metal layer is disposed only at the light-shielding layer 2 composed of the two superimposed colors R and B.

The array side on the display-section side opposite the display-section side having the data-line lead-out wiring 4 need not be provided with any metal wiring whatsoever. Further, this array side may be provided with common electrode wiring (21 or 22 only) comprising only one metal layer, namely the first metal layer or the second metal layer.

This liquid crystal display device can be manufactured by a method similar to that of the first exemplary embodiment merely by replacing the wiring patterns and frame color-overlap patterns with those of the second exemplary embodiment.

By virtue of the above-described arrangement, in a manner similar to that of the first exemplary embodiment, the light-shielding performance on the side of the color filter is sufficiently high at the frame portion on the sides formed to have the three superimposed colors, and the low-resistance common electrode wiring 21, 22 formed by two layers of metal wiring stabilizes the common potential of the display area at the frame portion on the side formed to have the two superimposed colors and compensates for the light-shielding performance of the light-shielding layer 2 composed of two superimposed colors. As a result, the frame on all four sides of the display area can be provided with an excellent appearance. Moreover, since the clearance between the side of the array substrate 20 and the side of the color-filter substrate 10 can be made sufficiently large, an excellent display is obtained without interference occurring when the cell gap is formed.

In each of the foregoing exemplary embodiments, a color-layer pattern composed of the three colors R, G, B is described. However, the present invention is not limited to these exemplary embodiments and can be applied in a case where a color-layer pattern of four or more colors is formed and is also similarly applicable to three primary colors other than R, G, B.

Examples of utilization of the present invention are not limited to active-matrix liquid crystal display devices using the IPS method but also include a normally-black active-matrix liquid crystal display device having a similar color filter of light-shielding layers of superimposed colors, as well as equipment using this liquid crystal display device, such as a computer monitor, liquid crystal TV, cellular telephone terminal, GPS terminal, car navigation system, game machine, bank and convenience-store terminal and medical diagnostic equipment.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An active-matrix liquid crystal display device, the liquid crystal of which is normally black, comprising:
    a first substrate having color layers of three or more colors; and
    a second substrate on which an active-matrix array is formed;
    wherein said first substrate has a structure, which does not have a black matrix layer, in which the color layers are stacked in a frame portion surrounding a display area;
    a first light-shielding layer in which color layers of three or more colors are stacked is formed on the frame portion on a side of the display area from which scanning lines are led out and on a side of the display area from which data lines are led out, from among four sides of the display area;
    a second light-shielding layer in which color layers of two colors are stacked is formed on the frame portion on at least one side of the other remaining sides of the display area;
    two metal layers to which a common electrode potential is applied are placed in an area of the second substrate opposing the second light-shielding layer; and
    an insulating layer is placed between the two metal layers.

2. The device according to claim 1, wherein the two colors of the second light-shielding layer are red and blue.

3. The device according to claim 1, wherein the side of the display area on which the second light-shielding layer is formed is provided with an injection hole for injecting liquid crystal.

4. The device according to claim 2, wherein the side of the display area on which the second light-shielding layer is formed is provided with an injection hole for injecting liquid crystal.

5. The device according to claim 1, wherein on sides where scanning-line and data-line leads are present, the frame portion at a periphery of the display area has the first light-shielding layer of stacked layers of three or more colors so that light-shielding performance is excellent even in areas in which light cannot be blocked by metal electrodes of the active-matrix substrate.

6. The device according to claim 5, wherein on at least one side of two sides where the scanning-line and data-line lead-out wiring do not exist has the second light-shielding layer of two superimposed colors.

7. The device according to claim 1, wherein each color layer has a thickness on an order of 1.5 μm.

8. The device according to claim 1, wherein each metal layer has a thickness of about 2500 Å.

9. The device according to claim 1, wherein the device has a cell gap of 3.5 μm.

10. The device according to claim 1, wherein the stacked color layers substitute for a black matrix.

11. The device according to claim 1, wherein the stacked color layers substitute for a black matrix where the frame portion can be positively shielded from light while a supply of the common electrode potential in the second substrate with the active-matrix array by a low resistance is facilitated.

12. An active-matrix liquid crystal display device, the liquid crystal of which is normally black, comprising:
    a first substrate having color layers of three or more colors; and
    a second substrate on which an active-matrix array is formed;
    wherein said first substrate has a structure in which the color layers are stacked in a frame portion surrounding a display area;
    a first light-shielding layer in which color layers of three or more colors are stacked is formed on the frame portion on a side of the display area from which scanning lines are led out and on a side of the display area from which data lines are led out, from among four sides of the display area;
    a second light-shielding layer in which color layers of two colors are stacked is formed on the frame portion on at least one side of the other remaining sides of the display area;

two metal layers to which a common electrode potential is applied are placed in an area of the second substrate opposing the second light-shielding layer; and an insulating layer is placed between the two metal layers, wherein the stacked color layers substitute for a black matrix.

13. The device according to claim 12, wherein the two colors of the second light-shielding layer are red and blue.

14. The device according to claim 12, wherein the side of the display area on which the second light-shielding layer is formed is provided with an injection hole for injecting liquid crystal.

15. The device according to claim 13, wherein the side of the display area on which the second light-shielding layer is formed is provided with an injection hole for injecting liquid crystal.

16. The device according to claim 12, wherein on sides where scanning-line and data-line leads are present, the frame portion at a periphery of the display area has the first light-shielding layer of stacked layers of three or more colors so that light-shielding performance is excellent even in areas in which light cannot be blocked by metal electrodes of the active-matrix substrate.

17. The device according to claim 16, wherein on at least one side of two sides where the scanning-line and data-line lead-out wiring do not exist has the second light-shielding layer of two superimposed colors.

18. The device according to claim 12, wherein each color layer has a thickness on an order of 1.5 μm.

19. The device according to claim 12, wherein each metal layer has a thickness of about 2500 Å.

20. The device according to claim 12, wherein the device has a cell gap of 3.5 μm.

* * * * *